Patented June 28, 1932

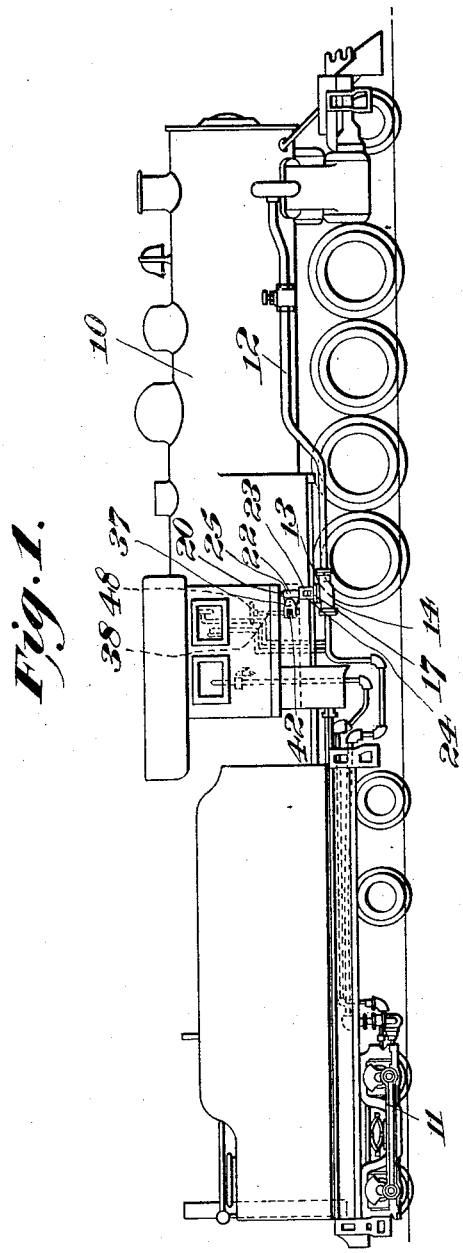

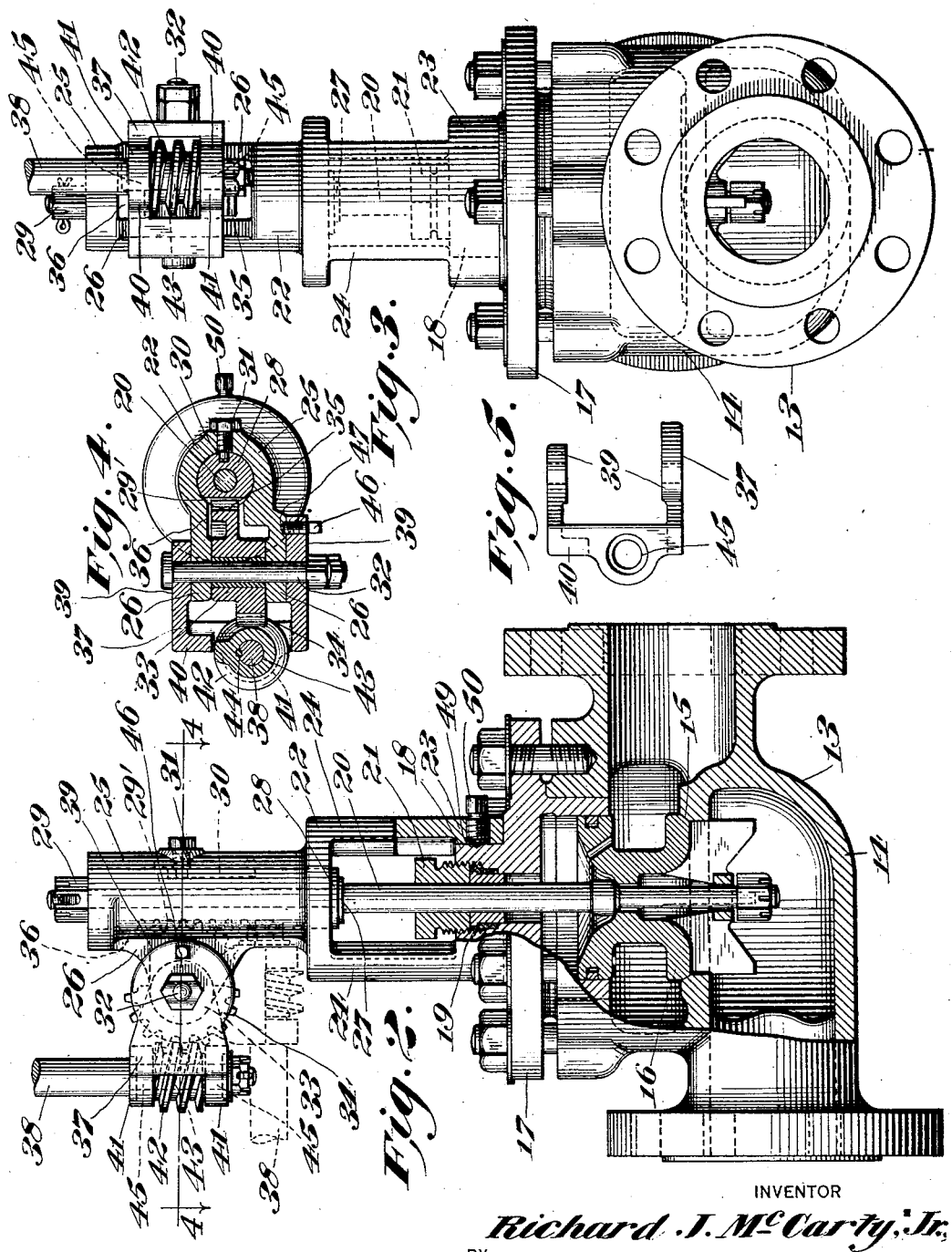

1,864,605

UNITED STATES PATENT OFFICE

RICHARD J. McCARTY, JR., OF BETHLEHEM, PENNSYLVANIA, ASSIGNOR TO BETHLEHEM STEEL COMPANY

VALVE

Application filed February 24, 1928. Serial No. 256,605.

My invention relates to valves in general and more particularly devices for operating valves.

The object of my invention is to provide a valve operating device which may be more or less standardized and adjustable so that it may be positioned without difficulty within easy reach of an operator when the latter by the nature of the operation is confined to a particular station.

The novel features of my invention will be more fully understood from the following description and claims taken with the drawings in which:

Fig. 1 illustrates diagrammatically a steam locomotive embodying one form of my invention;

Fig. 2 is a partial cross section of a throttle valve with my invention adapted thereto;

Fig. 3 is a side view of the valve shown in Fig. 2;

Fig. 4 is a cross section taken on the line 4—4 in Fig. 2; and

Fig. 5 is a detail of the worm supporting member of my operating device.

Referring to the drawings: 10 designates a locomotive boiler and 11 an auxiliary locomotive engine which is supplied with steam from the boiler 10 by means of the pipe 12. The flow of steam to the auxiliary engine is controlled by the throttle valve 13 placed in the pipe 12. The valve 13 comprises a casing 14 having a valve seat 15 receptive of the valve plate 16.

Extending from the upper face of the cover plate 17 of the casing 14 is a cylindrical boss 18 provided with a bore 19 through which the valve stem 20 extends. The bore 19 is recessed and threaded to receive a suitable gland packing device including a nut 21 having a central opening which slidingly and rotatably receives the stem 20.

A post 22 is rotatably supported on the boss 18 to constitute a support for my valve operating device. The post 22 preferably comprises a lower annular member 23, and a pair of spaced column members 24 supporting a guide member 25. A pair of spaced lugs 26 extend laterally from said guide member.

The valve stem 20 is provided with a collar 27 which is spaced from its upper end and a sleeve 28 fits on the valve stem and is held against said shoulder by the nut means 29 threaded on the end of the valve stem.

The guide member 23 is bored axially to slidingly receive the sleeve 28. On the side of the latter are formed a plurality of teeth to constitute a rack 29'. To prevent rotation of the sleeve 28 in the guide member 23, I provide a keyway 30 receptive of the end of screw 31 which is threaded in the wall of the guide member 23. The lugs 26 are apertured to receive a shaft 32 and journaled thereon, intermediate said lugs, is a cylindrical member 33. A portion at the periphery of the latter is formed to constitute a worm sector 34, while a portion of the periphery, diametrically opposite the sector 34, is formed to constitute a pinion sector 35. The latter sector extends through an opening 36 formed in the wall of the guide member 23 and meshes with the rack 29'. Also rotatably mounted on the shaft 32 is a member 37 which supports the worm shaft 38.

Referring to Figs. 2 and 5, the member 37 comprises a yoke having arm portions 39 and connecting end portions 40. The arm portions 39 straddle the lugs 26 and are suitably journaled, as at 41, to receive the worm shaft 38. The end portions 40 are spaced apart to receive a worm 42 which is adapted to mesh with the sector 34 and said worm 42 is bored axially, as at 43, and is feathered, as at 44, to receive the grooved end of the worm shaft 38.

The end portions 40 are apertured, as at 45, in alignment with the bore 43 of the worm 42 to rotatably support the end of the worm shaft 38.

Assuming that my device is used to operate a valve in a pipe located near the engineer's cab of a locomotive, the worm shaft may be placed in position, as shown in full lines in Fig. 2, or it may be tilted vertically to any position, as shown in broken lines in Fig. 2. To allow this tilting movement, the member 37 rotates upon the shaft 20 while the worm shaft is slowly rotated to synchronize with said movement and in this manner the worm shaft is placed in the desired position without moving the sector 34. When the position of the worm shaft is established it is fixed in position by means of the set screw 46 which is threaded in an aperture formed in the guide member 25. A recess 47 is formed in the side of member 26, in alignment with the axis of said screw 46, and said recess is suitable to receive the end of said screw and thereby prevent movement of the member 37 when the position of the worm shaft has been established. The extending end of the latter shaft is provided with a handwheel 48 so that the said shaft may be conveniently rotated by the engineer when he desires to operate the valve.

It will be easily seen that when the handwheel 48 is rotated in a certain direction, the sector 34 is caused to rotate and raise the valve stem by virtue of the engagement of pinion sector with the rack 29, thereby lifting the valve plate from its seat.

In order to allow the operating shaft to be displaced or adjusted angularly about the longitudinal axis of the valve stem 20, the post 22 may be rotated about its axis and when the position is established, a recess 49 formed in the boss receives the end of a set screw 50 which is threaded through the wall of the annular member 23. So it will be easily understood that when it is necessary to adjust the operating shaft angularly about the longitudinal axis of the valve stem 20, set screw 50 is removed and the post 22 rotated to the desired position, the boss 18 is recessed, as at 49, in alignment with the threaded opening for the set screw 50, and the latter is screwed into said recess to clamp the post in position.

From the foregoing description it will be seen that I have devised a valve operating device which is easily to set up in position with respect to the operator.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described my invention what I claim as new and desire to secure by Letters Patent, is:

1. A valve comprising a casing, a valve plate having a stem, a worm wheel adapted to reciprocate said stem, a worm in mesh with said wheel, and means for supporting said worm for planetary movement about the axis of said wheel.

2. A valve comprising a casing, a valve plate having a stem, a worm sector operably connected to said stem, a member supporting said sector, a worm in mesh with said sector, a worm supporting member rotatably mounted on said supporting member and adapted to be rotated about the axis of said sector, means to rotate said worm, and means to prevent the rotation of said worm supporting member.

3. A valve operating mechanism comprising a supporting member, a shaft supported on said member, a worm wheel mounted on said shaft, a worm in mesh with said wheel, a member rotatably mounted on said shaft for supporting said worm, and a shaft for rotating the latter.

4. A valve operating mechanism comprising a supporting member, a shaft supported on said member, a worm wheel mounted on said shaft, a worm in mesh with said wheel, a member rotatably mounted on said shaft for supporting said worm, a shaft for rotating the latter, and means to prevent the rotation of said worm supporting member.

5. A valve comprising a casing, a cover plate closing said casing, a valve plate having a stem slidably mounted in said cover plate, a worm sector operably connected to said stem, a supporting member rotatably mounted on said cover plate and adapted to support said sector, a worm in mesh with said sector, a worm supporting member rotatably mounted on said supporting member and adapted to be rotated about the axis of said sector, means to rotate said worm, means to prevent the rotation of said member, and fastening means to clamp said supporting member to said cover plate.

6. A valve comprising a casing, a valve plate having a stem, a worm sector adapted to reciprocate said stem, a worm in mesh with said wheel, means for supporting said worm for planetary movement about the axis of said sector, means for supporting the first mentioned means for angular movement about the axis of said stem, means to lock said worm to prevent said planetary movement, and means to lock the second mentioned means to prevent said angular movement.

7. A device comprising a valve casing having a seat, a valve member adapted to engage said seat, a valve stem provided with teeth to constitute a rack, a supporting member including a shaft, a gear member rotatably mounted on said shaft, a worm, means to support said worm, said gear member having a worm sector meshing with said worm and a pinion sector meshing with said rack, and means to rotate said worm.

8. A device comprising a valve casing having a seat, a valve member adapted to engage said seat, a valve stem connected to said valve member, a valve stem manipulator member, an adjustable support for the latter member, a gear means operably connecting the manipulator member to the valve stem, and an adjustable support for said gear means.

9. A valve comprising a casing having a seat, a valve member adapted to engage said seat, a valve stem connected to said valve member, a valve stem manipulator member, a gear means operably connecting the manipulator member to the valve stem, means to pivotally support said manipulator member, and means for supporting said gear means for angular movement about the axis of said stem.

In testimony whereof I hereunto affix my signature.

RICHARD J. McCARTY, Jr.